(12) United States Patent  (10) Patent No.: US 8,105,163 B2
Kim  (45) Date of Patent: Jan. 31, 2012

(54) CONTROL DEVICE AND CONTROL METHOD

(75) Inventor: Yeonkyung Kim, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1045 days.

(21) Appl. No.: 11/628,543

(22) PCT Filed: Mar. 23, 2005

(86) PCT No.: PCT/JP2005/005197
§ 371 (c)(1),
(2), (4) Date: May 2, 2007

(87) PCT Pub. No.: WO2005/119599
PCT Pub. Date: Dec. 15, 2005

(65) Prior Publication Data
US 2007/0238523 A1  Oct. 11, 2007

(30) Foreign Application Priority Data

Jun. 4, 2004  (JP) .................................. 2004-167489

(51) Int. Cl.
*A63F 9/24* (2006.01)
*A63F 13/00* (2006.01)
(52) U.S. Cl. ................. 463/33; 463/32; 463/31; 463/30; 463/7
(58) Field of Classification Search ........... 463/7, 30–33
See application file for complete search history.

(56) References Cited

U.S. PATENT DOCUMENTS
2001/0024972 A1* 9/2001 Kitao .............................. 463/33

FOREIGN PATENT DOCUMENTS
| JP | 7-116343 A | | 5/1995 |
| JP | 11-066343 | | 3/1999 |
| JP | 11-235466 A | | 8/1999 |
| JP | 11235466 A | * | 8/1999 |
| JP | 2004-105218 A | | 4/2004 |

(Continued)

OTHER PUBLICATIONS

Appeal Decision dated Jun. 10, 2008, from the corresponding Japanese Application.

(Continued)

*Primary Examiner* — Peter DungBa Vo
*Assistant Examiner* — Jasson Yoo
(74) *Attorney, Agent, or Firm* — Katten Muchin Rosenman LLP

(57) ABSTRACT

A technology for expressing object movements with higher levels of realism is provided. A control part 30 arranged in a game apparatus 10 includes an input part 40 and a control part 60. The control part 60 includes a standard mode control part 66 which controls a game mode in which a user-operated character moves in the water, and a fishing mode control part 68 which controls a game mode that starts when the character preys on a lure. The standard mode control part 66 includes a physical quantity modification part 62 which modifies a physical quantity given to the object or a physical quantity pertaining to the movement of the object depending on the type of the movement of the object. The fishing mode control part 68 includes a line control part 64 which connects a plurality of established control points with lines to express a fishing line in a simulated fashion.

7 Claims, 4 Drawing Sheets

FOREIGN PATENT DOCUMENTS

| JP | 2004105218 A | * | 4/2004 |
| WO | WO 97/31338 A1 | | 8/1997 |

OTHER PUBLICATIONS

International Search Report in English from the corresponding PCT/JP2005/005197.

Written Opinion of the International Search Authority from the corresponding PCT/JP2005/005197.

International Preliminary Report of Patentability (II) for the International Application PCT/JP2005/005197.

Office Action dated Jun. 7, 2005 for the corresponding Japanese Patent Application 2004-167489.

Office Action dated Dec. 27, 2005 for the corresponding Japanese Patent Application 2004-167489.

Notification of Reason(s) for Refusal dated Feb. 12, 2008, for corresponding Japanese Patent Application JP 2004-167489.

* cited by examiner (a)

(b)

(a)

(b)

CONTROL DEVICE AND CONTROL METHOD

CROSS-REFERENCE TO RELATED APPLICATION

This application is a National Phase of PCT Application PCT/JP2005/005197, filed on Mar. 23, 2005, now PCT Publication WO 2005/119599, and claims priority from Japanese Patent Application 2004-167489 filed Jun. 4, 2004, the contents of which are herein wholly incorporated by reference.

TECHNICAL FIELD

The present invention relates to control technology, and more particularly to a control apparatus and a control method for controlling the movement of a user-operated object.

BACKGROUND ART

Conventionally, game apparatuses in which characters move in a virtually constructed three-dimensional space are well known. In some of these games, the three-dimensional space is provided with ponds, oceans, and the like so that characters move in water.

DISCLOSURE OF THE INVENTION

Problems to be Solved by the Invention

Nevertheless, there has been no game apparatus developed to date that takes advantage of control technology for expressing the behavior of characters and objects in water with high levels of realism.

The present invention has been developed in view of the foregoing circumstances. It is thus a general purpose thereof to provide a technology for expressing object movements with higher levels of realism.

Means to Solve the Problems

One embodiment of the present invention relates to a control apparatus. This control apparatus comprises: an input part which receives an instruction from a user; and a control part which controls movement of an object operated by the user, based on the user instruction input from the input part, and wherein: the control part includes a first control part which controls a first operation mode, and a second control part which controls a second operation mode in which the object is operated with an operation system different from in the first operation mode; the first control part keeps a point of view for generating an image showing a surrounding situation of the object to a position behind the object so as to follow the object, and sets a direction of view to a direction of movement of the object; and the second control part sets the point of view to a position behind the object, and keeps the direction of view unchanged.

Another embodiment of the present invention also relates to a control apparatus. This control apparatus comprises: an input part which receives an instruction from a user; and a control part which controls movement of an object operated by the user, based on the user instruction input from the input part, and wherein the control part includes a modification part which modifies a physical quantity given to the object or a physical quantity pertaining to the movement of the object depending on a type of the movement of the object. For example, the physical quantity may be a speed, acceleration, coefficient of friction, coefficient of restitution, buoyancy, tension, and the like.

Another embodiment of the present invention also relates to a control apparatus. This control apparatus comprises: an input part which receives an instruction from a user; and a control part which controls movement of an object operated by the user, based on the user instruction input from the input part, and wherein the control part includes a line control part which connects a plurality of established control points with lines to express a linear object in a simulated fashion when the user-operated object and another object make a movement to pull against each other through the linear object. For example, the linear object may be a string, rope, bar, and the like. For example, the physical quantity may be a speed, acceleration, coefficient of friction, coefficient of restitution, buoyancy, tension, and the like.

Advantages of the Invention

According to the present invention, it is possible to provide a technology for expressing object movements with higher levels of realism.

BEST MODE FOR CARRYING OUT THE INVENTION

Figure 1:
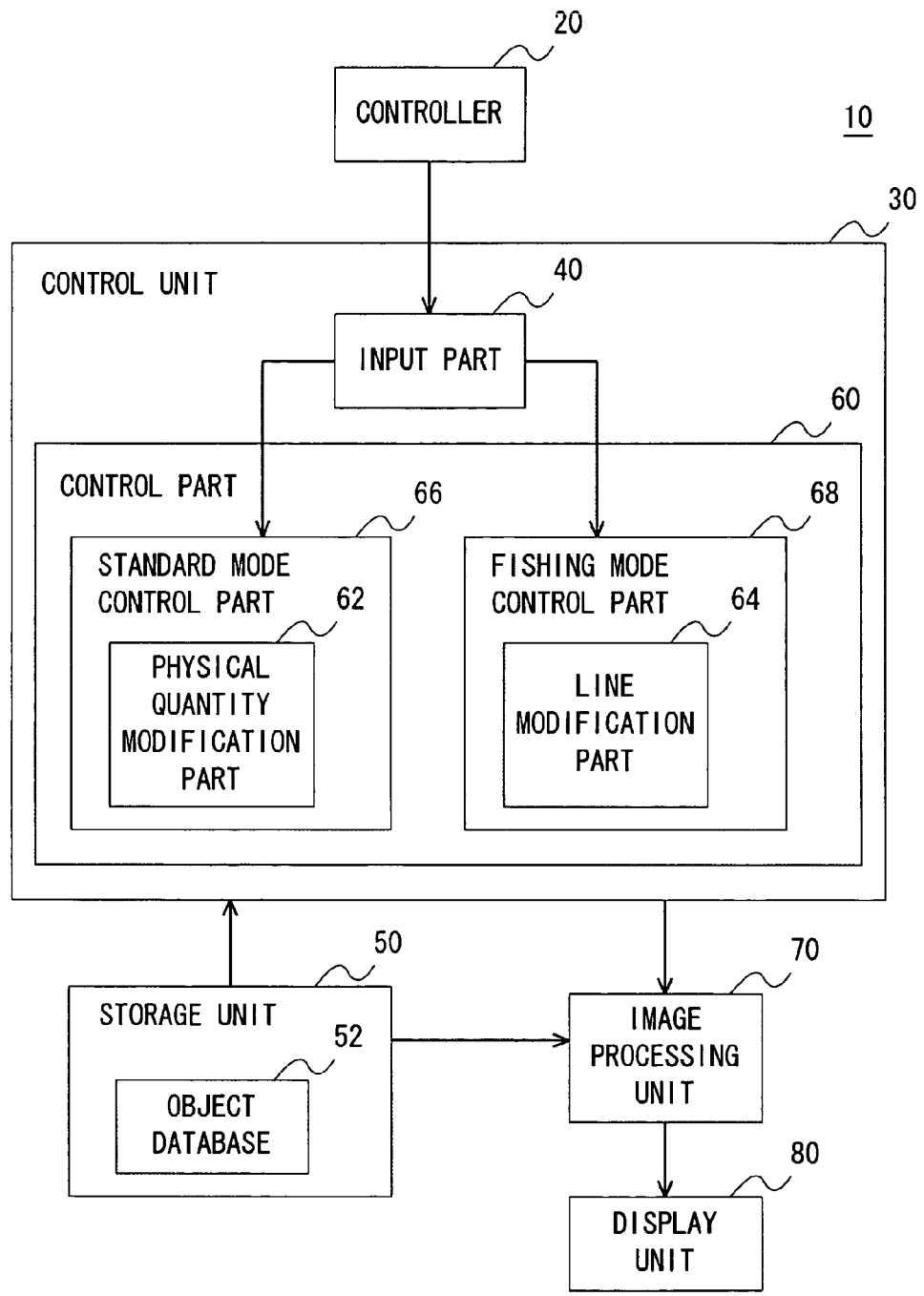
FIG. 1 is a diagram showing the configuration of a game apparatus which includes a control unit according to an embodiment.

FIG. 1 shows the configuration of a game apparatus 10 which includes a control unit 30 according to an embodiment. The game apparatus 10 comprises a controller 20, the control unit 30, a storage unit 50, an image processing unit 70, and a display unit 80. In terms of hardware, part of the configuration shown in FIG. 1 can be achieved by use of an arbitrary computer CPU, memory, and other LSIs. In terms of software, the same can be achieved by a program which is loaded on the memory. The functional blocks shown in FIG. 1 are achieved by the cooperation of these aforementioned items. It therefore will be understood by those skilled in the art that these functional blocks may be achieved by various formations, including hardware alone, software alone, or a combination thereof.

The game apparatus 10 in accordance with the present embodiment realizes a game in which a user operates a fish character to overcome a series of set challenges and proceed with a story while moving in and around a pond, preying on other fishes, and picking up items. The user can operate the fish character to move in water and get an operational sense of feeling like a fish in a simulated fashion. In the game apparatus 10, a battle with an angler starts when the user-operated character preys on a lure cast by the angler. The user can operate the character to get away by cutting the fishing line or unhooking the lure from the body of the character. If it cannot get away but is instead pulled in, the angler may release it if predetermined conditions are met. If the predetermined conditions are not met, the game is over.

Hereinafter, the game mode in which a user-operated character moves in water to hunt for items or prey on other fishes will be referred to as "standard mode," and the game mode that starts when it preys on a lure will be referred to as "fishing mode." The present embodiment will deal primarily with control technology for making character movements, object behavior and the like in water look more natural in the standard mode, and control technology for improving gameability in the fishing mode.

The control unit 30 includes an input part 40 and a control part 60. The input part 40 receives a control signal input from the controller 20 which is operated by the user. The control part 60 executes a game program based on the user instruction received by the input part 40, thereby progressing the game. The control part 60 changes and manages control information and the like, including the current position of the user-operated character, the position of the point of view and the direction of view of a camera for generating a screen that depicts the game world, and various flag information and parameters that the game program uses. The control part 60 includes a standard mode control part 66 which controls the standard mode and a fishing mode control part 68 which controls the fishing mode.

The storage unit 50 stores data that the game program executed by the control unit 30 requires. The storage unit 50 includes an object database 52 which stores shape data and the like of objects placed in the game world. The object database 52 contains the shape data on three-dimensional objects placed in the three-dimensional virtual reality world, and physical quantities such as mass given to various objects.

The image processing unit 70 generates a game screen which is controlled by the control unit 30. The image processing unit 70 initially reads three-dimensional data on objects from the object database 52, and renders the objects based on the position of the point of view and the direction of view of the camera set by the control unit 30, thereby generating an image of the game world. The image processing unit 70 then adds images that show indicators for indicating the hunger level and the like of the character, and items obtained by the character, to the generated image of the game world in order to generate a game screen. The display unit 80 displays the game screen generated by the image processing unit 70.

Figure 2:
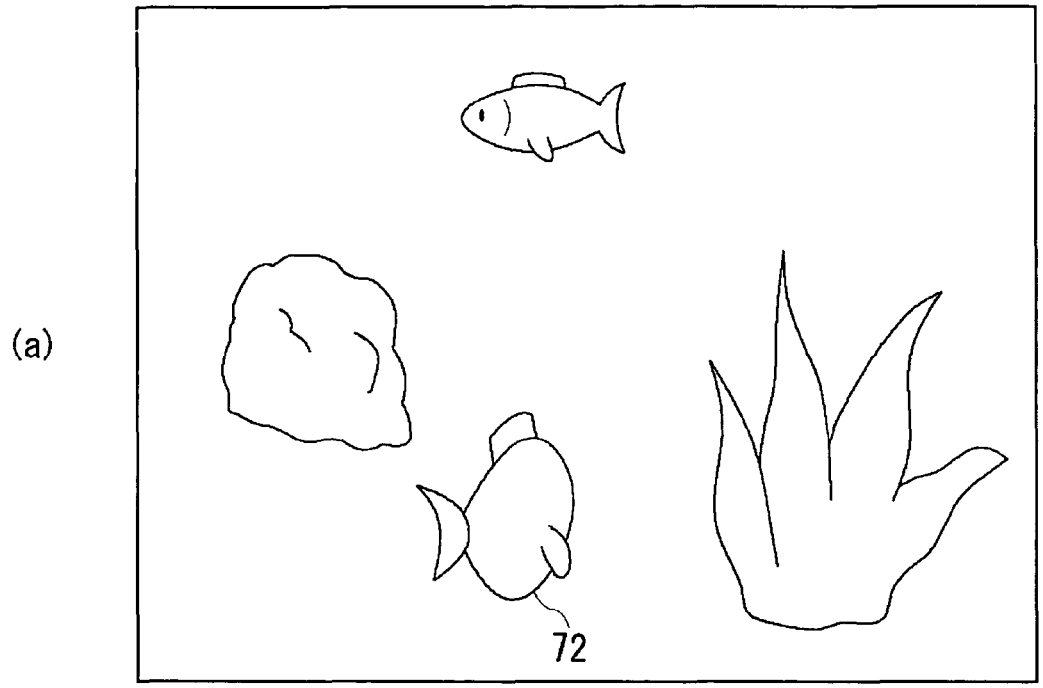
FIG. 2(a) is a diagram showing an example of a game screen in standard mode.
FIG. 2(b) is a diagram showing control keys on a controller in the standard mode.
Figure 2:
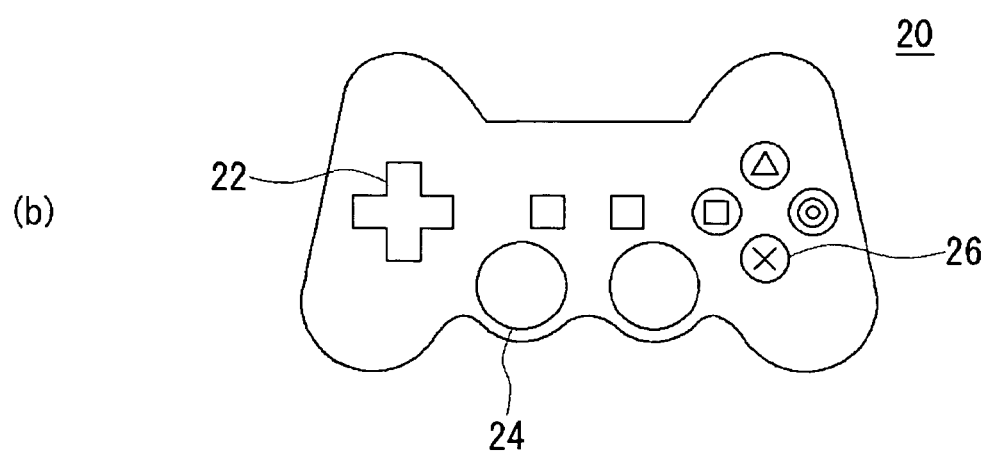

FIG. 2(a) shows an example of the game screen in standard mode, and FIG. 2(b) shows control keys on the controller 20 in standard mode. The standard mode control part 66 receives direction instruction signals input from direction instruction input keys of the controller 20, such as arrow keys 22 and levers 24, and changes the direction of movement of a character 72 to the left, right, top, or bottom accordingly. Of the buttons on the controller 20, the standard mode control part 66 also receives an input from, for example, a button 26 for instructing a forward move, and moves the character 72 in its current direction of movement. As a result, the user can move the character 72 in desired directions in the game world. In this instance, the standard mode control part 66 sets the point of view of the camera for the image processing unit 70 used to generate the game screen to a position a predetermined distance behind the current position of the character 72, and sets the direction of view to the direction of movement of the character 72. That is, in standard mode, control is exercised so that the camera lying behind the character 72 follows the character 72. This makes it possible for the user to move the character 72 while viewing the game world from directly behind the character 72.

Figure 3:
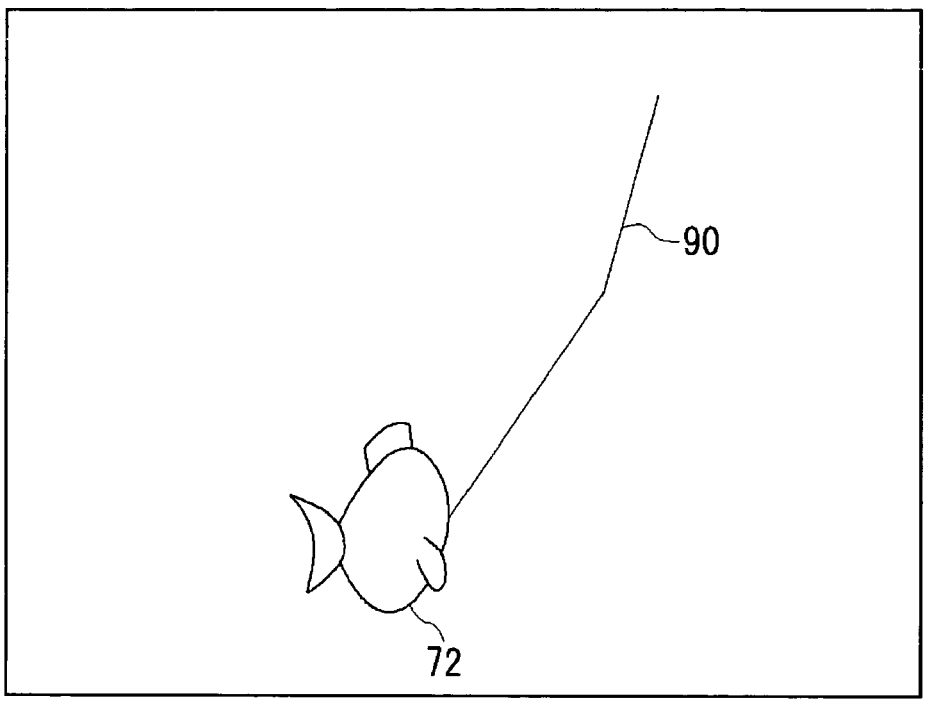
FIG. 3(a) is a diagram showing an example of the game screen in fishing mode.
FIG. 3(b) is a diagram showing control keys on the controller in the fishing mode.
Figure 3:
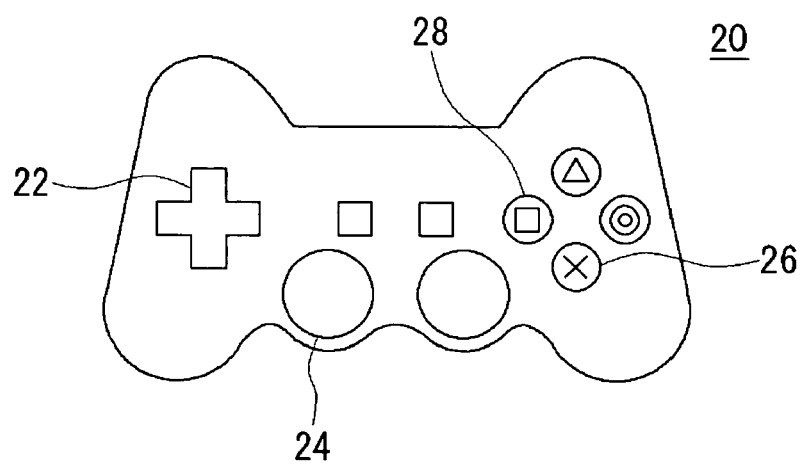

FIG. 3(a) shows an example of the game screen in fishing mode, and FIG. 3(b) shows the control keys on the controller 20 in fishing mode. When the character 72 preys on a lure or the character 72 catches its body on a lure in standard mode, the game enters fishing mode and the control shifts to the fishing mode control part 68. The fishing mode control part 68 receives direction instruction signals input from the direction instruction input keys of the controller 20, such as the arrow keys 22 and the levers 24, and moves the character 72 to the left, right, front, or rear accordingly. Unlike standard mode, the character 72 in fishing mode is moved to the left, right, front, or rear, and not to the left, right, top, or bottom.

The fishing mode control part 68 sets a parameter for indicating the strength of a fishing line 90 in advance, and lowers the strength of the fishing line 90 when the user operates the character 72 to pull the fishing line 90 in a predetermined direction. If the strength of the fishing line 90 falls below a predetermined threshold, the fishing mode control part 68 cuts the fishing line 90. When the fishing line 90 is cut, fishing mode ends and the game returns to standard mode. In this case, the user gains the lure. The fishing mode control part 68 may receive an input from the button 28, which is assigned to the action of the character 72 beating an object with its tail fin, from the controller 22, and display the movement of the character beating the fishing line 90 with its tail fin and lower the strength of the fishing line 90 by a predetermined amount.

The direction in which the fishing line 90 can be pulled to break it (hereinafter, simply referred to as the "cutting direction") is determined by the position of a virtually-provided rod tip. While the character 72 is pulling the fishing line 90 in the cutting direction, the fishing mode control part 68 displays the fishing line 90 in red to inform the user accordingly. In addition to this, when the character 72 is pulling the fishing line 90 slightly off the cutting direction, the fishing mode control part 68 displays the fishing line 90 in yellow to inform the user accordingly. While checking the display status of the fishing line 90, the user operates the arrow keys 22 of the controller 20 to look for the cutting direction, and moves the character 72 in the cutting direction to apply load to the fishing line 90. The fishing mode control part 68 receives inputs from the arrow keys 22, and moves the character to the left, right, front, or rear, but not to the left, right, top, or bottom, using an operation system different from in standard mode. This makes it possible to realize the game of moving the character 72 in the cutting direction and cutting the fishing line 90.

The fishing mode control part 68 changes the position of the rod tip while in the fishing mode. This changes the cutting direction with time, thereby avoiding monotonous game play in the fishing mode, providing enhanced gameability.

In fishing mode, it would be difficult to ascertain which direction the character is moving in and the difficulty level of the game would become extremely high if the camera follows the character 72 as in standard mode, while the user looked for the cutting direction. Therefore, in the present embodiment, the fishing mode control part 68 keeps the direction of view of the camera unchanged while moving the position of the point of view in parallel according to the movement of the character 72. As a result, in fishing mode, the character 72 can be operated with the direction of view kept in the same direction all the time. This assists the user when looking for the cutting direction, and makes the game enjoyable for a wide range of users.

As detailed above, according to the present embodiment, the control unit 60 switches the operation systems depending on the game mode and changes the way of setting the position of the point of view of the camera. This makes it possible to set an appropriate difficultly level according to the characteristics of the game, providing enhanced gameability.

The standard mode control part 66 includes a physical quantity modification part 62 which modifies the physical quantities given to characters and objects when necessary. In the present embodiment, the control unit 30 makes physical calculations to determine the movement of the user-operated character and the behavior of objects and the like placed in the three-dimensional game world that has been virtually constructed in and above the water, based on the physical quantities given thereto such as mass, speed, acceleration, the coefficient of static friction, the coefficient of dynamic friction, the coefficient of restitution, and the spring constant. This makes it possible to realize highly realistic motions conforming to the laws of nature.

It is not always desirable, however, to reproduce all phenomena in conformity with the actual physical laws. For example, emphasized character motions may sometimes make it easier for users to grasp the situation. Furthermore, object movements shown in an exaggerated manner may sometimes look rather realistic. In view of these circumstances, in accordance with the present embodiment, character and object movements are therefore calculated with various physical quantities modified, depending on the situation. This makes it possible to realize easily comprehensible, highly realistic motions.

Figure 4:
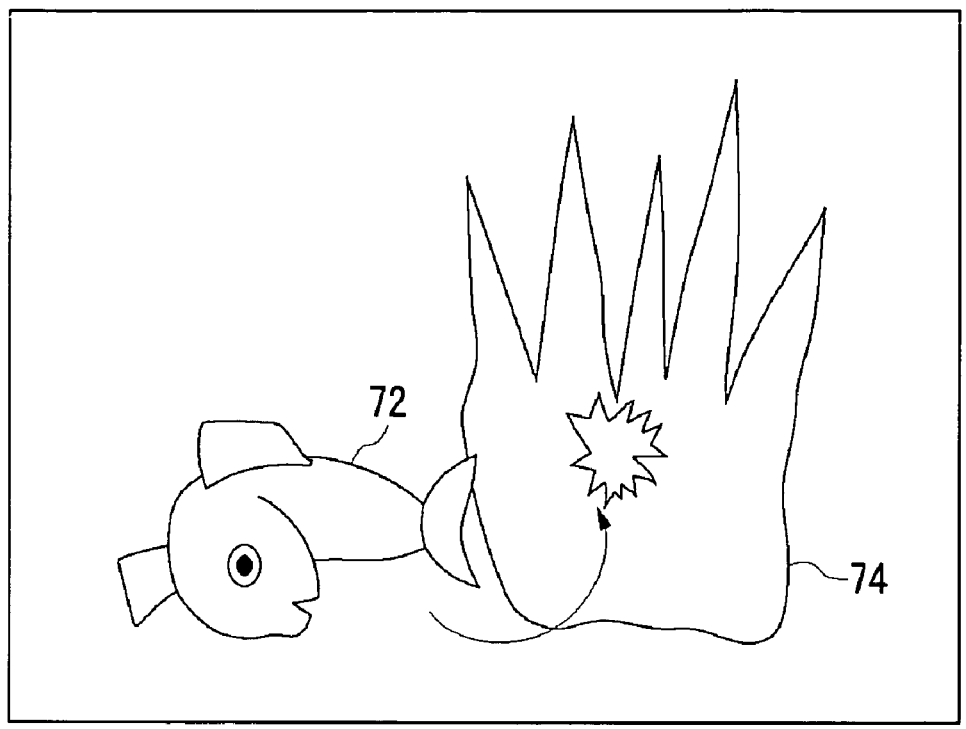
FIG. 4 is a diagram showing a game screen displaying that a character hits an object with its tail fin.

FIG. 4 shows an example of the game screen which is displayed on the display unit 80. In the example shown in FIG. 2, the character 72 is displayed as hitting an object 74 with its tail fin according to a user instruction. The control part 60 determines the amount by which the character 72 moves away from the object 74 in reaction to the object-hitting force, and moves the position of the character accordingly. In this example, the physical quantity modification part 62 modifies physical quantities to be used for the calculation depending on the type of object, the surrounding conditions, and the like. For example, when the character 72 hits such an object as a rock with its tail fin, the amount of bounce of the character 72 may be increased. When the character 72 attacks another fish by hitting it with its tail fin, the amount of bounce of the character 72 may be decreased. Bouncing the character 72 more than the actual amount of bounce expected when it hits an object such as a rock can put emphasis on, and remind the user of, the phenomenon of bouncing. Moreover, if the character 72 fighting against another fish bounces back greatly each time it hits the other fish with its tail fin, the complicated movement of the character 72 can impair user operability. Thus, the amount of bounce may be made smaller than in reality.

Furthermore, for example, the physical quantity modification part 62 may also modify the buoyancy acting on the character depending on the character position. In reality, buoyancy hardly varies with location. Modifying the buoyancy with location, however, can introduce changes into the game and enhance the appeal of the game.

Figure 5:
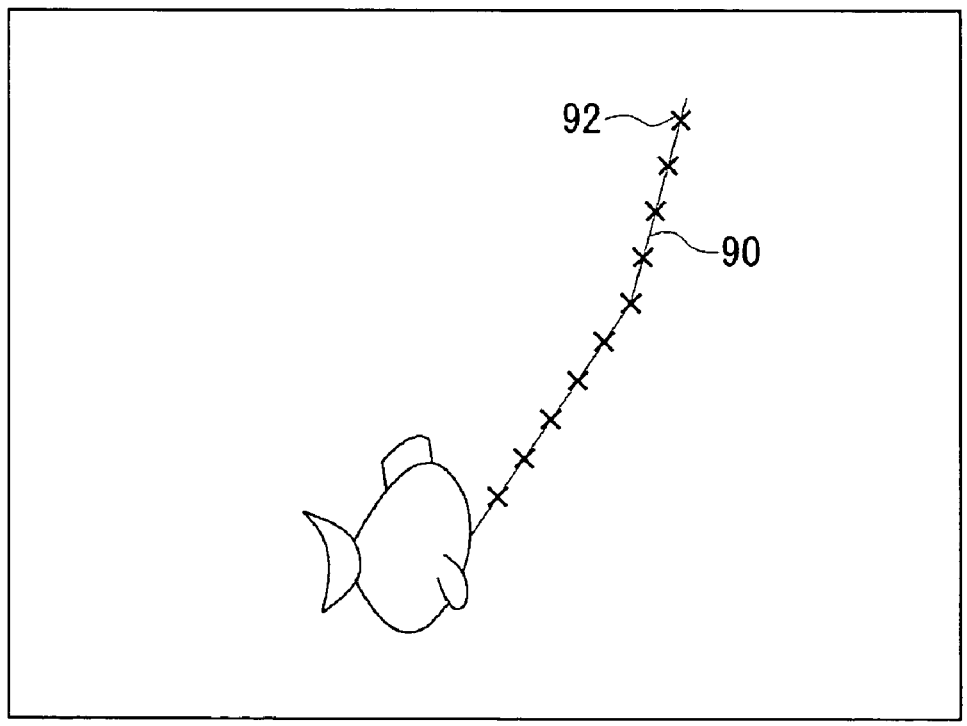
FIG. 5 is a diagram showing how a fishing line is expressed with a plurality of control points.

The fishing mode control part 68 includes a line control part 64 which controls the behavior of the fishing line used when trying to fish the character. As shown in FIG. 5, the line control part 64 provides a large number of control points 92, and connects them with lines to express the fishing line 90 in a simulated fashion. If the fishing line 90 were handled as a single line, it would be difficult to express its slackening and the like due to variations in tension, depending on the direction of pulling. For that reason, the line control part 64 controls the movement of the large number of control points 92 individually, and connects them with lines to show the line as if it were a single fishing line 90. For example, the line control part 64 may calculate speeds, accelerations, tensions, and the like of the individual control points 92, and control the movement of the control points 92 accordingly.

Up to this point, the present invention has been described in conjunction with the embodiment thereof. This embodiment has been given solely by way of illustration. It will be understood by those skilled in the art that various modifications may be made to combinations of the foregoing components and processes, and all such modifications are also intended to fall within the scope of the present invention.

INDUSTRIAL APPLICABILITY

The present invention is applicable to a control apparatus which controls the movement of a user-operated object.

The invention claimed is:

1. A control apparatus comprising;
an input part, which receives an instruction from a user; and
a control part, which controls movement of a character object operated by the user based on the user instruction input from said input part, and wherein
said control part includes a first control unit that controls a first operation mode in which the character object is moved forward along the x-axis and y-axis in a three-dimensional space, and a second control unit that controls a second operation mode in which the character object is moved along a two-dimensional plane relating to the x-axis and z-axis of said three-dimensional space, the second operation mode operated with an operation system different from in the first operation mode;
wherein, within the first operation mode, said first control unit instructs the character object to move in a forward direction and to be controlled along the x-axis and y-axis, maintains a tracking perspective of the character object showing the perspective of a background and an immediate foreground behind the character object, and sets the tracking perspective according to the movement of the character object until a designated event occurs in the first operation mode whereby the first operation mode is switched to the second operation mode by the control part; and
wherein, within the second operation mode, said second control unit controls the character object so as to move the character object in the three-dimensional space along the two-dimensional plane as instructed by the user, sets the perspective of the character object to a fixed tracking perspective whereby the perspective is fixed to a position in the immediate foreground, behind the character object, and maintains the perspective in the same orientation regardless of the movement of the character object along the two-dimensional plane.

2. The control apparatus according to claim 1, wherein said second control unit includes a line control part, which connects a plurality of established control points with a plurality of lines to express a linear object in a simulated fashion when the character object operated by the user and another object interact to pull against each other through the linear object.

3. The control apparatus according to claim 2, wherein said line control part controls behavior of the linear object by calculating a physical quantity at the control points.

4. The control apparatus according to claim 3, wherein the physical quantity is a speed or acceleration of the object, or a force acting on the object.

5. A control method performed by a computer for controlling movement of a character object operated by a user, the method comprising:

receiving by the computer an instruction on a direction of movement of the character object from the user by a first control unit that controls a first operation mode in which the character object is moved forward along the x-axis and y-axis in a three-dimensional space;

controlling the direction of the movement of the character object to a direction as instructed from the user, maintaining a tracking perspective of the character object showing the perspective of a background and an immediate foreground behind the character object, and setting the tracking perspective according to the movement of the character object until a designated event occurs in the first operation mode whereby the first operation mode is switched to a second operation mode;

receiving an instruction on the direction of movement of the character object from the user by a second control unit that controls the second operation mode where the object is moved along a two-dimensional plane relating to the x-axis and z-axis of said three-dimensional space, the second operation mode operated with an operation system different from in the first operation mode; and controlling the character object so as to move the character object in the three-dimensional space along the two-dimensional plane as instructed by the user, setting the perspective of the character object to a fixed perspective whereby the perspective is fixed to a position in the immediate foreground, behind the character object, and maintaining the perspective in the same orientation regardless of the movement of the character object along the two-dimensional plane.

6. A non-transitory, computer-readable recording medium having recorded therein a program comprising:

a receiving module, which receives an instruction on a direction of movement of a character object from a user when controlling movement of the character object operated by the user in a first operation mode in which the object is moved forward along the x-axis and y-axis in a three-dimensional space;

a first controlling module, which controls the direction of the movement of the character object to a direction as instructed from the user, maintaining a tracking perspective of the character object showing the perspective of a background and an immediate foreground behind the character object, and setting the tracking perspective according to the movement of the character object;

a second receiving module, which receives an instruction on the direction of movement of the character object from the user in a second operation mode to which the first operation mode is switched when a designated event occurs in the first operation mode, where the object is moved along a two-dimensional plane relating to the x-axis and z-axis of said three-dimensional space, the second operation mode operated with an operation system different from in the first operation mode; and a second controlling module, which controls the character object so as to move the character object in the three-dimensional space along the two-dimensional plane as instructed by the user, setting the perspective of the character object to a fixed perspective whereby the perspective is fixed to a position in the immediate foreground, behind the character object, and maintaining the perspective in the same orientation regardless of the movement of the character object along the two-dimensional plane.

7. A non-transitory, computer-readable recording medium containing a program for realizing:

a function by which a first control unit that controls a first operation mode in which a character object is moved forward along the x-axis and y-axis in a three-dimensional space, upon receiving an instruction on a direction of movement of the character object from a user when controlling movement of the character object operated by the user;

a function by which the first control unit controls the direction of the movement of the character object to a direction as instructed from the user, maintaining a tracking perspective of the character object showing the perspective of a background and an immediate foreground behind the character object, and setting the tracking perspective according to the movement of the character object;

a function by which a second control part, which controls a second operation mode where the character object is moved along a two-dimensional plane relating to the x-axis and z-axis of said three-dimensional space, the second operation mode operated with an operation system different from in the first operation mode, receives an instruction on the direction of movement of the object from the user, the second operation mode being switched from the first operation mode when a designated event occurs in the first operation mode; and a function by which the second control part controls the character object so as to move the character object in the three-dimensional space along the two-dimensional plane as instructed by the user, setting the perspective of the character object to a fixed perspective whereby the perspective is fixed to a position in the immediate foreground, behind the character object, and maintaining the perspective in the same orientation regardless of the movement of the character object along the two-dimensional plane.

* * * * *